Figure 1:
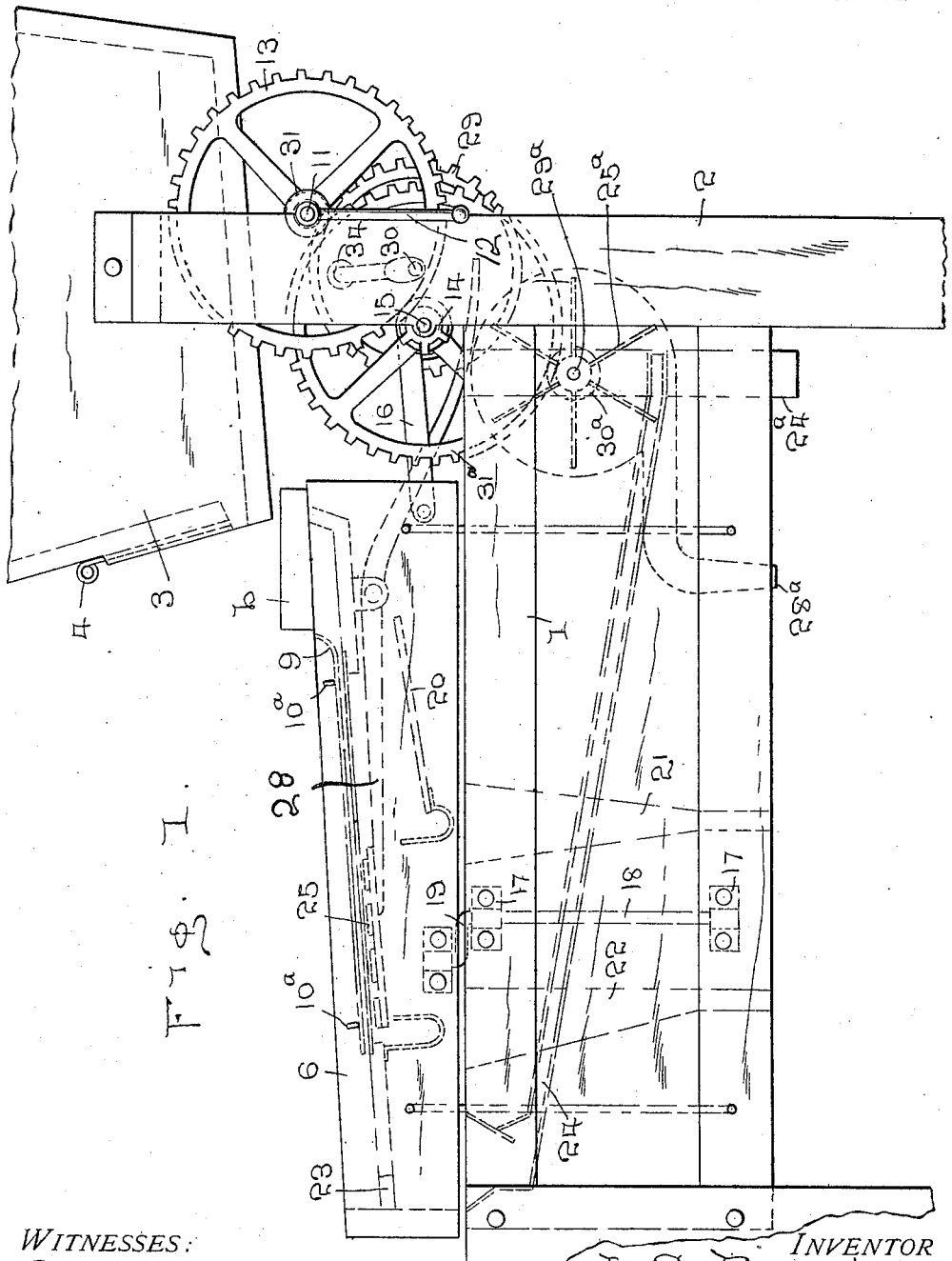

J. S. BROYLES.
SEED WHEAT CLEANER.
APPLICATION FILED SEPT. 9, 1911.

1,027,813.

Patented May 28, 1912.
4 SHEETS—SHEET 1.

WITNESSES:

INVENTOR
J. S. Broyles
BY W. J. FitzGerald
Attorneys

J. S. BROYLES.
SEED WHEAT CLEANER.
APPLICATION FILED SEPT. 9, 1911.
1,027,813.
Patented May 28, 1912.
4 SHEETS—SHEET 2.
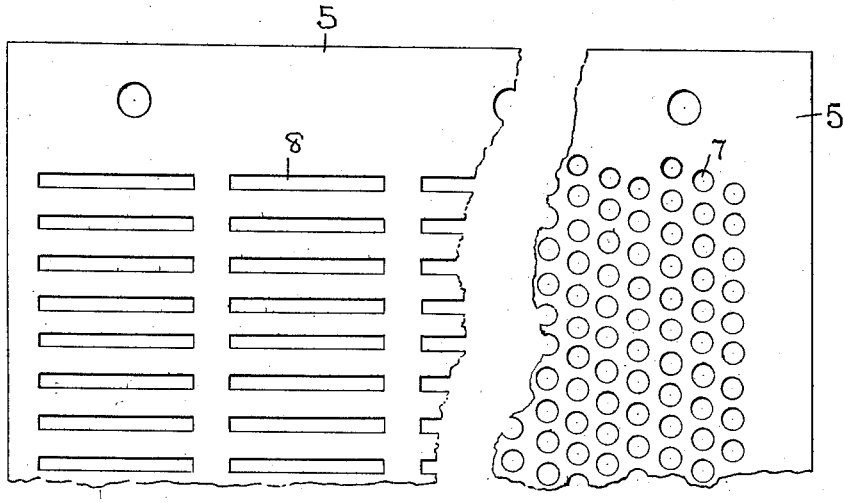
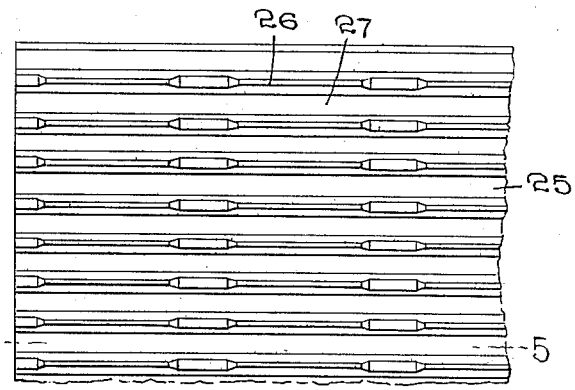
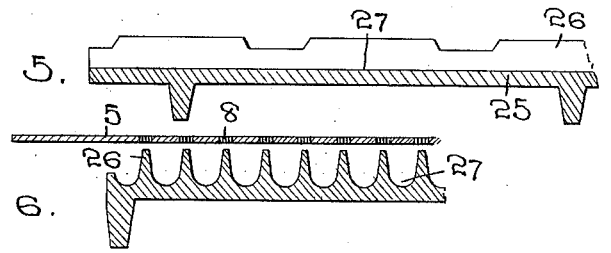
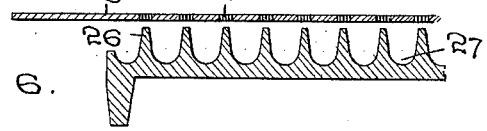
WITNESSES:
INVENTOR
J. S. Broyles
BY W. J. FitzGerald
Attorneys

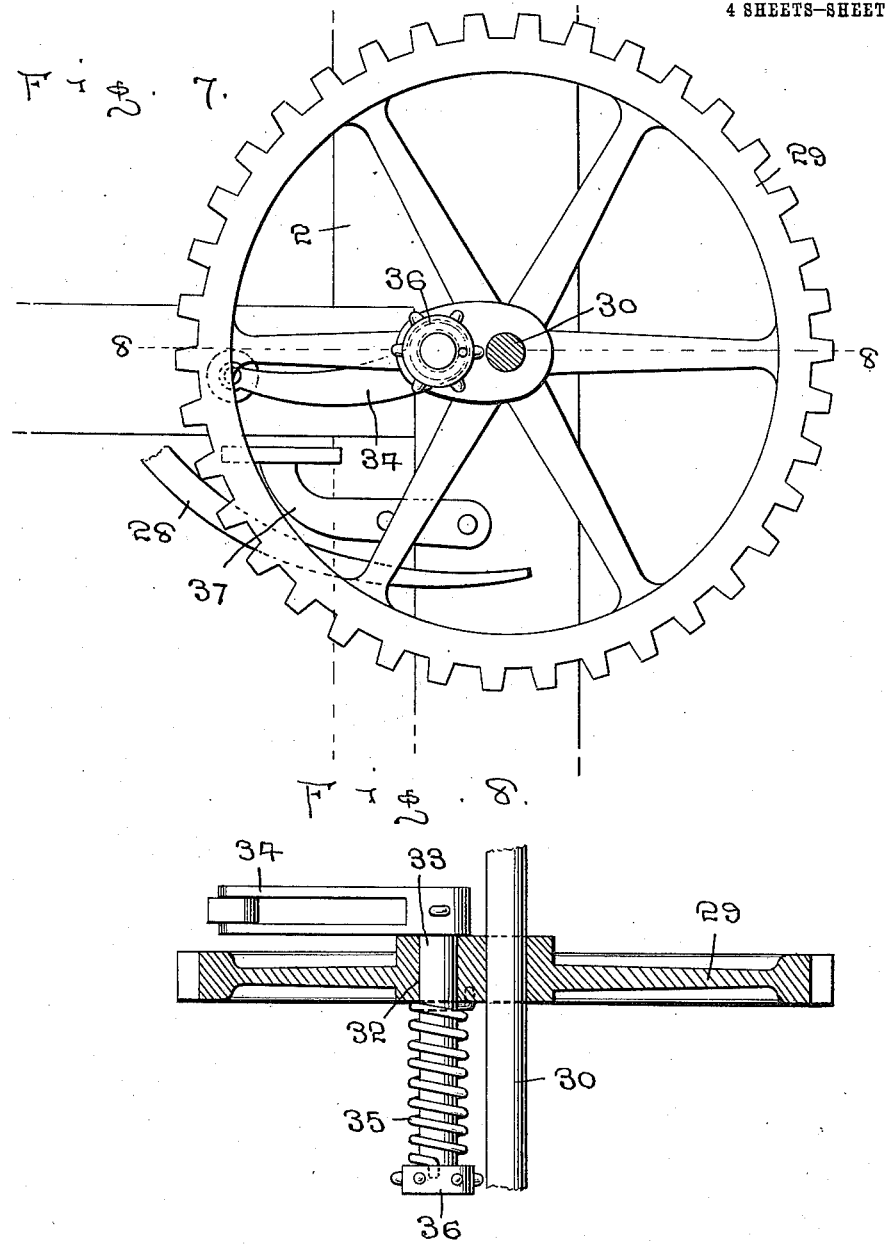

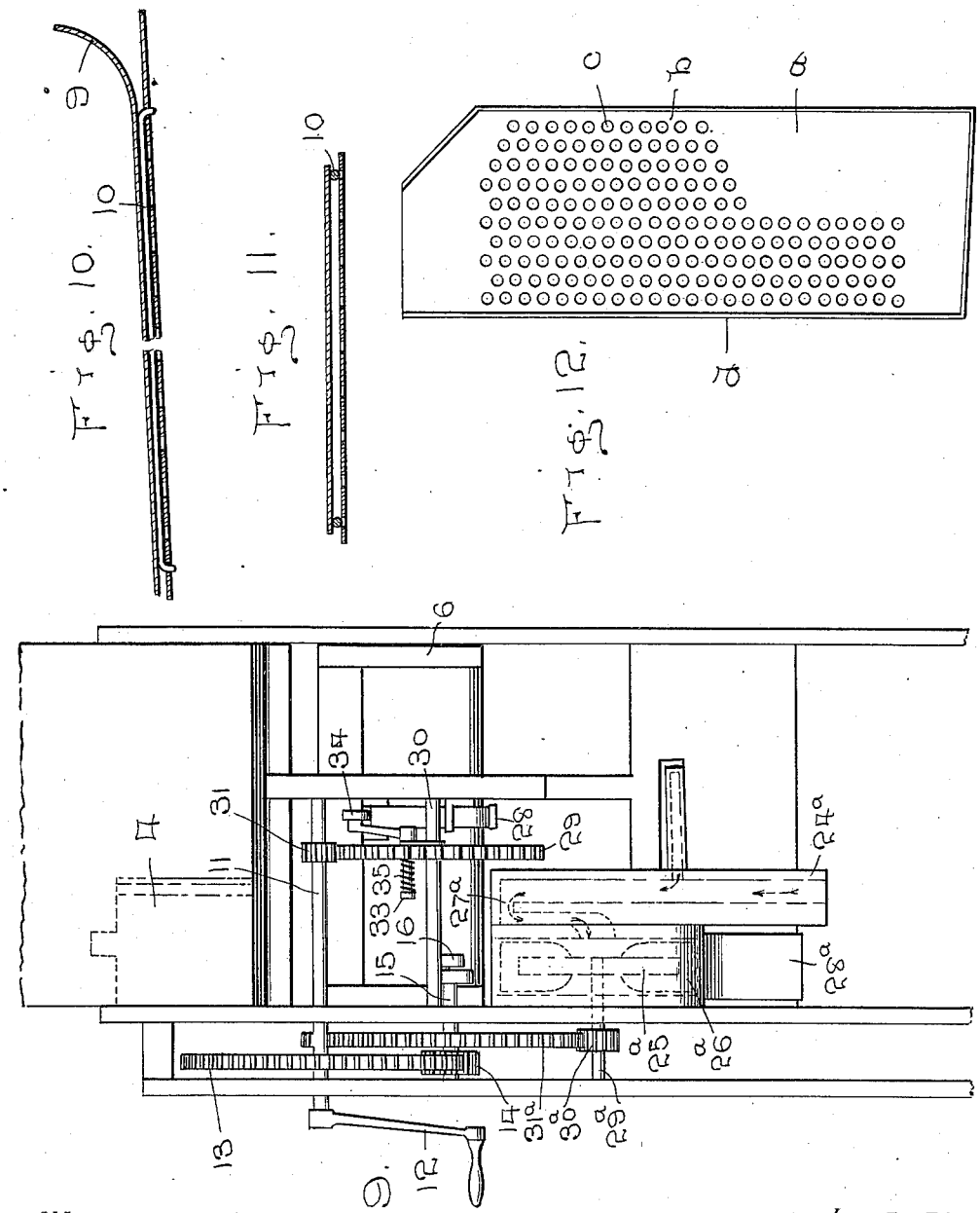

UNITED STATES PATENT OFFICE.

JAMES S. BROYLES, OF WIKEL, WEST VIRGINIA.

SEED-WHEAT CLEANER.

1,027,813.  Specification of Letters Patent.  Patented May 28, 1912.

Application filed September 9, 1911. Serial No. 648,443.

*To all whom it may concern:*

Be it known that I, JAMES S. BROYLES, citizen of the United States, residing at Wikel, in the county of Monroe and State of West Virginia, have invented certain new and useful Improvements in Seed-Wheat Cleaners; and I do hereby declare the following to be a full, clear, and exact description of the invention, such as will enable others skilled in the art to which it appertains to make and use the same.

My invention relates to new and useful improvements in seed wheat cleaners and more particularly to machines of this character for separating cheat and cockle from the wheat and my object is to provide a machine which takes advantage of the relative size and shape of the wheat and filth, in eliminating the latter.

A further object is to provide a grain plate provided with round openings for the cockle and elongated openings or slots for the cheat.

A further object is to provide a means for a compound vibratory movement of said grain plate.

A further object is to provide an automatic cleaning device for that portion of the grain plate having cheat openings therein.

A further object is to provide a regulating or crown plate for the grain plate, whereby the wheat will glide thereover without turning on its ends or piling on said grain plate.

A further object is to provide a plate for removing the trash, such as sticks, sections of straw, etc., previous to depositing the grain onto the grain plate, and, a further object is to provide a suction means for removing the lighter grains from the heavier grains of wheat.

Other objects and advantages will be hereafter referred to and more particularly pointed out in the specification and claims.

Before describing my invention and stating the claims therefor, I wish to state briefly why former methods along this line of inventions have failed to give the best results. The old sieve or screen method was sought to take advantage of the difference in the general size of the wheat and the tares, but owing to the fact that cheat and cockle are so nearly the size of wheat, this method alone is unsatisfactory where these make up the principal filth. The fanning mill takes advantage of the difference between their specific gravities, but since there is so little difference between the specific gravity of cockle and that of wheat, the fanning mill permits much of the heaviest cockle to pass out with the wheat. Furthermore, very much of both cheat and cockle are retained by the wheat instead of being carried off by the fan. The belt machine takes advantage of the difference in the shape of wheat and cockle in separating them, but it is only a cockle machine; and only a small per cent. of the cheat will be eliminated by it. Another objection is that it crushes too much of the wheat, rendering it unfit for seed. Therefore, for the above reasons, the belt machine, the fanning mill and the old sieve method, or any combination of them, have failed to meet the requirements of a perfect seed wheat cleaner, and realizing these general conditions and the need of a more satisfactory cleaner and grader among wheat growers, I have invented my machine which, I believe, and, through experiment, know will overcome these difficulties.

In the accompanying drawings forming a part of this application, Figure 1 is a side elevation of my machine complete, showing in dotted lines the operative parts therein. Fig. 2 is a fragmentary view of the grain plate showing the cheat eliminating openings therein. Fig. 3 is a similar view of the opposite end of said grain plate showing the cockle eliminating openings therein. Fig. 4 is a top plan view of a portion of the grain plate cleaning device. Fig. 5 is a longitudinal section therethrough as seen on line 5—5, Fig. 4. Fig. 6 is a transverse section of a portion of the plate cleaning device and plate adapted to be cleaned thereby. Fig. 7 is an enlarged detail elevation of the trip mechanism and lever for the plate cleaning device. Fig. 8 is a section as seen on line 8—8, Fig. 7. Fig. 9 is an end elevation of the machine. Fig. 10 is a longitudinal sectional view of the crown and gravity plate. Fig. 11 is a transverse sectional view thereof, and, Fig. 12 is a top plan view of the trash plate.

Referring to the drawings in which similar reference characters designate corresponding parts throughout the several views, 1 indicates a main frame, upon the vertical end bars 2 of which is mounted a hopper 3 for wheat or the like, said hopper being pivoted between said end bars and inclined somewhat downwardly, and said downwardly extending end being provided with a sliding door 4 adjacent one side of the hopper. The door 4 may be accordingly raised or lowered, as it is desired to allow more or less wheat from the hopper and as the wheat is allowed to flow therefrom, it drops onto the unperforated portion $a$ of a trash plate $b$ and passes thence through perforations $c$ onto an inclined grain plate 5 carried by a frame 6.

The trash plate $b$ is extended transversely of the machine and is surrounded on two sides and one end with a flange $d$, while a portion of one end of the trash plate is left free so that any sticks, sections of straw or similar foreign particles will pass off at the end of the trash plate and not come in contact with the grain plate.

The grain plate 5 is perforated throughout its length, that portion adjacent the end upon which the wheat first flows, being perforated with small round openings 7 and the remaining portion thereof being provided with elongated slots 8 spaced and arranged in rows, said slots being of a width almost equal to that of the wheat. It will be seen therefore that as the wheat flows upon the inclined grain plate and as said frame carrying the grain plate is reciprocated, the cockle and cheat forming the filth thereof, will be eliminated by passing through said cockle and cheat eliminating openings, thereby allowing the wheat to pass out in a clean state ready for use.

As stated, the forward portion of the grain plate 5 is provided with small round openings which, under ordinary circumstances, would be sufficiently large to allow the wheat also to pass therethrough as well as the cockle, that is, should the wheat be allowed to turn end over end as it passes thereacross, but as the length of wheat is anywhere from one and one-half to two and one-half times its diameter, it can be prevented from turning end over end by causing it to pass between two planes. This is accomplished by placing a regulating or crown plate 9 immediately above said grain plate and spacing the crown plate a predetermined distance from the grain plate by introducing wires 10 or similar means of proper gage between said plates, as best shown in Figs. 10 and 11 of the drawings.

The regulating or crown plate of my machine is adjusted by the operator by using wires of the right gage so that the space between it and the grain plate is usually little more than the small diameter of the largest wheat that is being cleaned, which, it will be seen, prevents the grain piling up upon the grain plate and at no time is there any pressure exerted upon the wheat by the crown plate since it is held off the grain plate by the aforesaid wires. The crown plate is prevented from raising off the said wires in any suitable manner, as by introducing wedges $10^a$ through the side walls of the frame 6 the inner ends of the wedges projecting over the crown plate. A shaft 11 mounted transversely of said end bars 2, is adapted to be rotated by means of a handle 12, said shaft having mounted thereon an enlarged spur gear 13, which meshes with a smaller gear 14 on the crank shaft 15. An arm extending from the grain plate frame 6 has one end mounted on said crank shaft 15, whereby when said shaft 11 is rotated, said grain plate frame and parts carried thereby will be reciprocated somewhat longitudinally. Mounted vertically of the frame 1 in the bearings 17, is an additional shaft 18 having a crank arm 19 at the upper end thereof which is secured in engagement with said grain plate frame 6, and as the crank arm 19 extends substantially obliquely to the longitudinal movement of the grain plate and frame carrying the same, it will be seen that, as said frame is reciprocated longitudinally, it will also be simultaneously vibrated laterally, thereby giving a compound vibratory motion and as the wheat is adapted to glide between the grain plate and the crown plate, the cockle will be separated therefrom and dropped upon the chute 21, while the cheat will pass through its respective openings and through the spout 22. The cleaned wheat then passes onto a chute 23 at the farther end of the machine and descends into a spout 24, from whence it is carried to a point adjacent the near end of the frame 1 where it is emptied into a down spout $24^a$, the spout 24 being inclined so as to carry the grain by gravity from the chute to the down spout. The spout 24 communicates with the down spout $24^a$ at a point adjacent its longitudinal center and in order to remove the lighter grains, I provide a suction fan $25^a$, which is mounted in a housing $26^a$ and by closing the upper end of the down spout $24^a$, the fan will cause an upward suction in the spout $24^a$ and will draw the lighter grains upwardly through space $27^a$ at the upper end of the down spout $24^a$ and into the fan housing, from whence it is discharged through a nozzle $28^a$. The fan is mounted upon a shaft $29^a$, to which is attached a pinion $30^a$ and meshing with said pinion is a gear $31^a$, mounted upon the shaft 15 and it will be seen that when the shaft 11 is rotated the fan $25^a$ will likewise be rotated and it will also be seen that by providing the suction fan for removing the lighter grains and particles, none but the plump and firm grains will be discharged from the down spout $24^a$.

As stated before, I have taken advantage of the differences in diameter between the wheat, the spherical cockle and the cheat, which is longer than wheat and smaller in diameter, for the separation of the filth from said wheat, by providing the small openings for the cockle and the elongated openings for the cheat, but as said elongated openings must be nearly the width of the diameter of the wheat, in order to take out all of the cheat, said wheat tends to fill up these elongated openings and thus prevent the cheat from passing therethrough. To overcome this clogging of the cheat eliminating openings, however, I have provided a positively actuated plate cleaning device 25 which may be provided with a plurality of projections 26 between which are the grooves 27, said projections being arranged so as to register with the elongated openings 8 when said plate cleaning device is brought into engagement with said grain plate, or the projections may be so arranged as to deliver a blow against the under face of the grain plate to jar the grains of wheat from the openings, or any other suitable mechanism may be used for this purpose. The plate cleaning device 25 is mounted upon one end of a lever 28 which is pivoted to said frame 6 and has the opposite end thereof extended to a point between the vertical end bars 2. An additional gear 29 mounted upon an auxiliary shaft 30 between the end bars 2, is adapted to be rotated through the medium of a spur gear 31, also mounted on the shaft 11 and eccentrically disposed in the hub of said gear 29 is an opening 32 receiving the shaft 33 of a trip hammer 34. Encompassing the shaft 33 beyond the gear 29, is a spring 35, one end of which is engaged with said gear and the opposite end with a collar 36, and a stop 37 is mounted on the end bars 2 above the extending end of the lever 28 and in the path of said trip hammer 34, whereby, it will be seen, that as said handle 12 is rotated for the reciprocation of the grain plate frame, thereby rotating the gear 29, said trip hammer will come into engagement with said stop 37 and be held thereby until the eccentricity of the trip hammer shaft releases it, which will amount to substantially one-third of a revolution of said gear 29. During this rest of the hammer, sufficient energy will be stored up in the coil spring by torsional stress to trip the end of the lever 28 of the plate cleaning device 25. This quick, snappy action of the hammer is necessary in order that the teeth of the plate cleaner may not mesh in the slots of the grain plate long enough to allow any cheat to pass thereover, and secondly, that the hammer may pass out of the path of the vibrating lever 28 the instant it has tripped the same.

It will be seen, therefore, that I have provided a machine for separating the cheat and cockle from the wheat that takes advantage of the relative size, shape and weight of the wheat and the filth in eliminating the latter and further in separating filth and dirt from the wheat, I have accomplished the same through the medium of a compound vibratory movement. It will further be seen that I have provided grain plates having varying sized perforations for the elimination not alone of the cockle, but also of the cheat, straws, sticks and the like, from the wheat and have further provided an automatic cleaning device for the cheat eliminating openings when the same become clogged from any reason whatsoever. It will further be seen that the wheat will pass over the grain plate, without turning end over end, through the medium of my improved regulating plate, and that I have provided a machine that is simple and economical in structure and perfect and effective in operation.

What I claim is:—

1. In a seed wheat cleaner, a grain plate mounted within a frame on an incline, said plate being provided with varied openings for the elimination of foreign matter within the wheat as the same passes thereover, means to vibrate said frame, a crown plate mounted on said grain plate, and means carried by said grain plate for spacing the latter from said crown plate, whereby the wheat passing over said grain plate will be prevented from piling thereon.

2. In a seed wheat cleaner, a grain plate mounted within a frame on an incline, said plate being provided with openings for the elimination of the filth from the wheat, a crown plate mounted on said grain plate, means to regulate the pressure of said crown plate thereon, means to vibrate said frame, and a lever pivoted in said frame and having means coöperating with said vibrating means for cleaning a portion of said grain plate.

3. In a seed wheat cleaner, the combination with a grain plate provided with openings for the elimination of the filth from the wheat; of a lever pivotally mounted under said grain plate and carrying at one end thereof cleaning means for a portion of the grain plate, said cleaning means having projections thereon adapted for engagement within the openings in the grain plate, and means to intermittently trip the opposite end of said lever, whereby said plate cleaning means will be effectively operated.

In testimony whereof I have signed my name to this specification in the presence of two subscribing witnesses.

JAMES S. BROYLES.

Witnesses:
R. S. MILLER,
G. W. BROYLES.